US009866031B2

(12) United States Patent
Baba et al.

(10) Patent No.: US 9,866,031 B2
(45) Date of Patent: Jan. 9, 2018

(54) METHOD AND APPARATUS FOR POWER CONTROL

(71) Applicant: KABUSHIKI KAISHA TOSHIBA, Tokyo (JP)

(72) Inventors: Kenji Baba, Kodaira (JP); Takaaki Enohara, Hino (JP); Nobutaka Nishimura, Koganei (JP); Kazumi Nagata, Fuchu (JP); Shuhei Noda, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 568 days.

(21) Appl. No.: 14/247,640

(22) Filed: Apr. 8, 2014

(65) Prior Publication Data
US 2014/0217823 A1 Aug. 7, 2014

Related U.S. Application Data

(62) Division of application No. 13/184,793, filed on Jul. 18, 2011, now Pat. No. 8,744,639.

(30) Foreign Application Priority Data

Sep. 14, 2010 (JP) .................................. 2010-205998

(51) Int. Cl.
H02J 4/00 (2006.01)
H02J 3/14 (2006.01)
H02J 13/00 (2006.01)

(52) U.S. Cl.
CPC ......... *H02J 4/00* (2013.01); *H02J 3/14* (2013.01); *H02J 13/0017* (2013.01);
(Continued)

(58) Field of Classification Search
CPC ............. H02J 4/00; H02J 3/14; H02J 13/0017
(Continued)

(56) References Cited

U.S. PATENT DOCUMENTS 5,259,553 A * 11/1993 Shyu ...................... F24F 1/022
165/224
6,906,476 B1 6/2005 Beatenbough et al.
(Continued)

FOREIGN PATENT DOCUMENTS

CN 101799681 8/2010
EP 1 263 108 A1 12/2002
(Continued)

OTHER PUBLICATIONS

First Office Action issued by Japanese Patent Office in counterpart Application No. 2010-205998 dated Apr. 1, 2014, and English translation thereof.
(Continued)

*Primary Examiner* — Mohammad Ali
*Assistant Examiner* — Sheela S Rao
(74) *Attorney, Agent, or Firm* — Finnegan, Henderson, Farabow, Garrett & Dunner, L.L.P.

(57) ABSTRACT

According to one embodiment, a power control apparatus includes a receiving unit, an environment-data acquiring unit, and a calculation unit. The receiving unit receives, from a power supplying side, a power-consumption reduction request for reducing power consumption at a power demanding side. The environmental data acquiring unit acquires, from the power demanding side, environmental data representing environmental state of the power demanding side. The calculating unit calculates a power-reduction value based on the environmental data, in response to the power-consumption reduction request.

4 Claims, 4 Drawing Sheets

(52) U.S. Cl.
CPC ....... *Y02B 70/3225* (2013.01); *Y02B 90/2607* (2013.01); *Y04S 20/222* (2013.01); *Y04S 40/12* (2013.01); *Y10T 307/438* (2015.04)

(58) Field of Classification Search
USPC ............... 700/295; 713/310; 361/62; 702/62
See application file for complete search history.

(56) References Cited

U.S. PATENT DOCUMENTS

| | | | |
|---|---|---|---|
| 7,545,053 | B2 | 6/2009 | Yoshikawa et al. |
| 2003/0036822 | A1 | 2/2003 | Davis et al. |
| 2005/0078184 | A1 | 4/2005 | Sakai et al. |
| 2005/0231869 | A1* | 10/2005 | Yoshikawa ............... H02J 9/06 361/62 |
| 2006/0184288 | A1 | 8/2006 | Rodgers |
| 2007/0135973 | A1 | 6/2007 | Petite |
| 2007/0271006 | A1 | 11/2007 | Golden et al. |
| 2008/0273754 | A1* | 11/2008 | Hick .................. G06K 9/00771 382/103 |
| 2009/0062970 | A1 | 3/2009 | Forbes, Jr. et al. |
| 2010/0138065 | A1 | 6/2010 | Taft |
| 2010/0152914 | A1 | 6/2010 | Ying |
| 2010/0217550 | A1* | 8/2010 | Crabtree .................. H02J 3/005 702/62 |
| 2010/0332373 | A1 | 12/2010 | Crabtree et al. |

FOREIGN PATENT DOCUMENTS

| | | |
|---|---|---|
| JP | 09-001170 | 1/1997 |
| JP | 11-098688 | 4/1999 |
| JP | 11-182910 | 7/1999 |
| JP | 2000-78748 | 3/2000 |
| JP | 2002-10532 | 1/2002 |
| JP | 2002-135977 | 5/2002 |
| JP | 2003-97841 | 4/2003 |
| JP | 2005-117542 | 4/2005 |
| JP | 2007-159298 | 6/2007 |
| JP | 2008-295193 | 12/2008 |
| JP | 2009-77498 | 4/2009 |
| JP | 2010-176373 | 8/2010 |
| WO | WO 03/090038 A1 | 10/2003 |
| WO | WO 2009/020606 A1 | 2/2009 |
| WO | WO 2009/023230 A1 | 2/2009 |

OTHER PUBLICATIONS

Noda et al., U.S. Appl. No. 13/186,014, filed Jul. 19, 2011.
Written Opinion of the Hungarian Intellectual Property Office in corresponding Singapore Patent Application No. 201105069-7 dated Jan. 13, 2012, 7 pages.
Notification of First Office Action issued by the State Intellectual Property Office of the People's Republic of China in Chinese Application No. 201110203563.7, dated Nov. 4, 2013, and English translation thereof.
Feng Yifei, Design & Development of Smart Control of Classroom Lighting, Database of Master's Degree Theses, No. 5, vol. 6, p. 14, Aug. 2007.
Search Report and Written Opinion in corresponding Singapore Patent Application No. 201105069-7 dated Jan. 13, 2012, 14 pages.
European Search Report dated Dec. 12, 2016 for European Application No. EP 11 17 3809.2 (10 pgs).

* cited by examiner

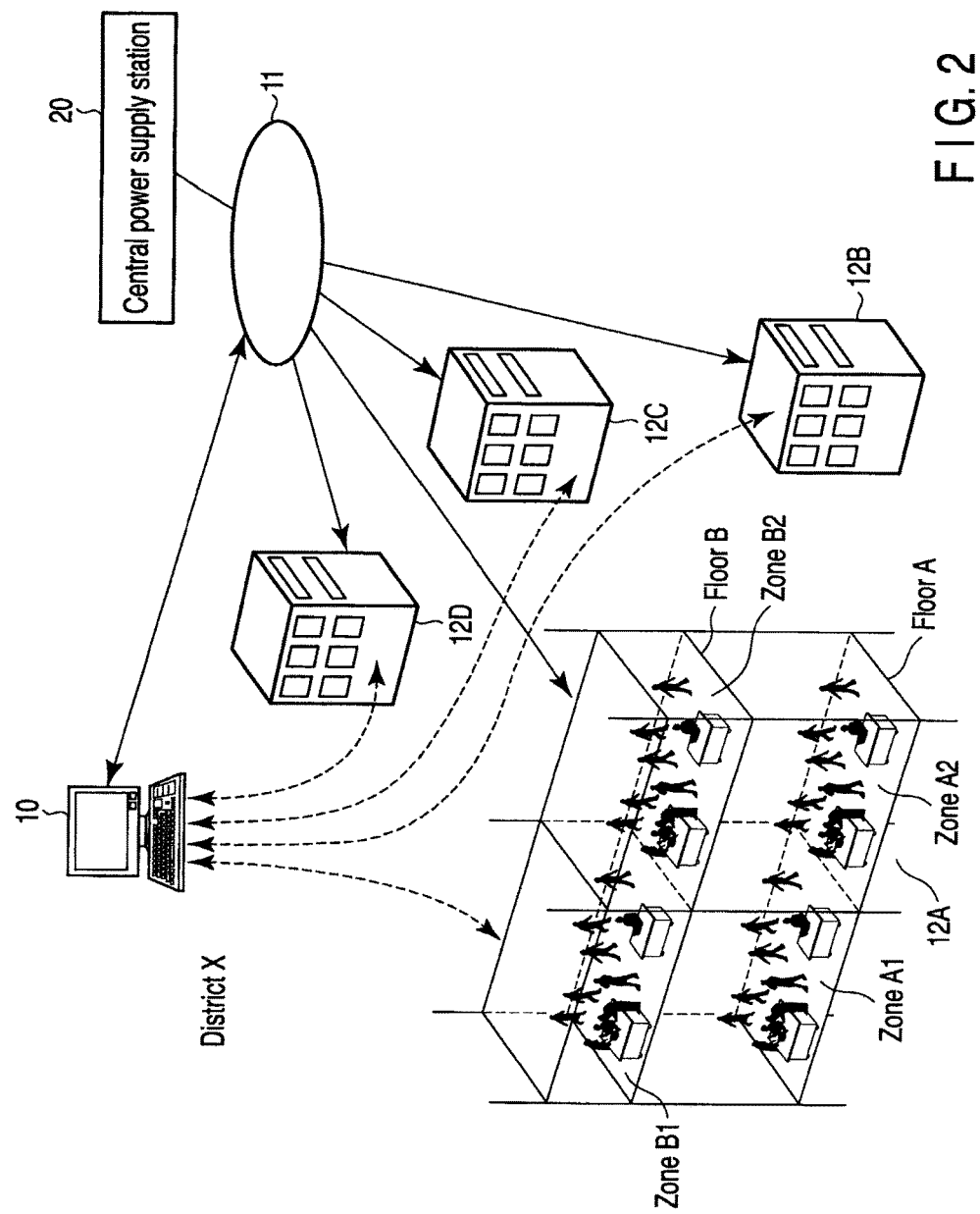
F I G. 2

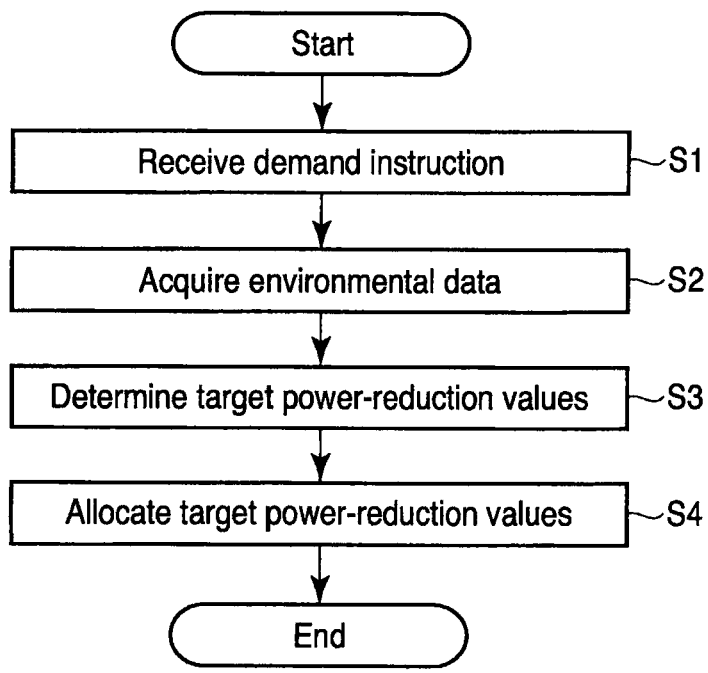
F I G. 3
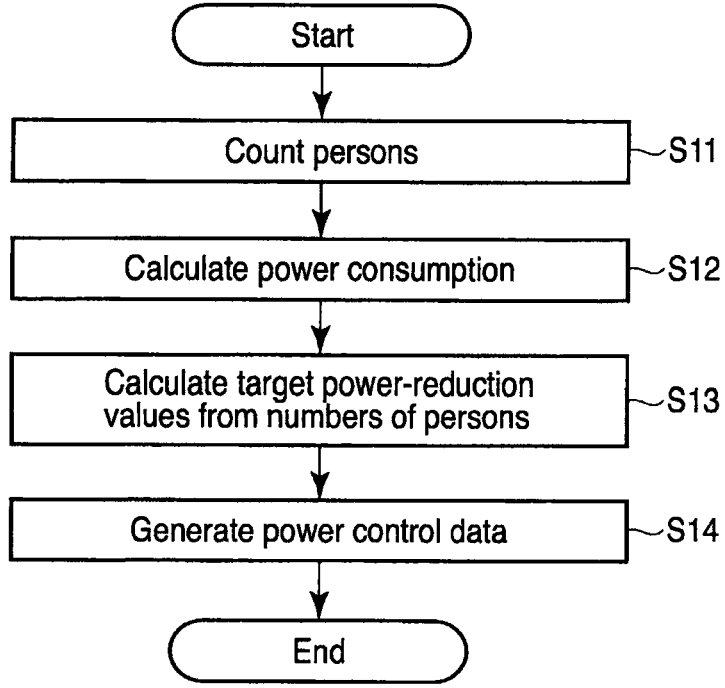
F I G. 4

METHOD AND APPARATUS FOR POWER CONTROL

CROSS-REFERENCE TO RELATED APPLICATIONS

This application is a division of U.S. application Ser. No. 13/184,794, filed Jul. 18, 2011, now U.S. Pat. No. 8,744,639, the entire contents of which are incorporated herein by reference.

FIELD

Embodiments described herein relate generally to a power control apparatus and a power control method, both designed to accomplish a power demand control.

BACKGROUND

In recent years, the development of a power supply system or a power network, either utilizing a data communication system called a smart grid, has been attracting attention. As a technique for achieving a smart grid, the technique of controlling power demand is particularly important.

The power demand control technique is a power control technique of reducing the power consumption on the power demanding side, making a response (also known as "demand response") to a power-consumption reduction request coming from the power supplying side.

In order to achieve the smart grid, the technique of controlling the power demand is of vital importance. The power demand control technique is a technique that has been designed to reduce the power consumption on the power demanding side. In practice, demand control is performed by using a power control apparatus that performs a power demand control, including the step of allocating to a power demanding side a value by which to save power.

BRIEF DESCRIPTION OF THE DRAWINGS

FIG. 2 is a block diagram explaining the configuration of the system at a power demanding side, also according to the embodiment;

FIG. 3 is a flowchart explaining a power demand control according to the embodiment;

FIG. 4 is a flowchart explaining another power demand control according to the embodiment;

DETAILED DESCRIPTION

In general, according to one embodiment, a power control apparatus comprises a receiving unit, an environment-data acquiring unit, and a calculation unit. The receiving unit receives, from a power supplying side, a power-consumption reduction request for reducing power consumption at a power demanding side. The environmental data acquiring unit acquires, from the power demanding side, environmental data representing environmental state of the power demanding side. The calculating unit calculates a power-reduction value based on the environmental data, in response to the power-consumption reduction request.

The embodiment will be described in detail, with reference to the accompanying drawings.

[Configuration of the System]

Figure 1:
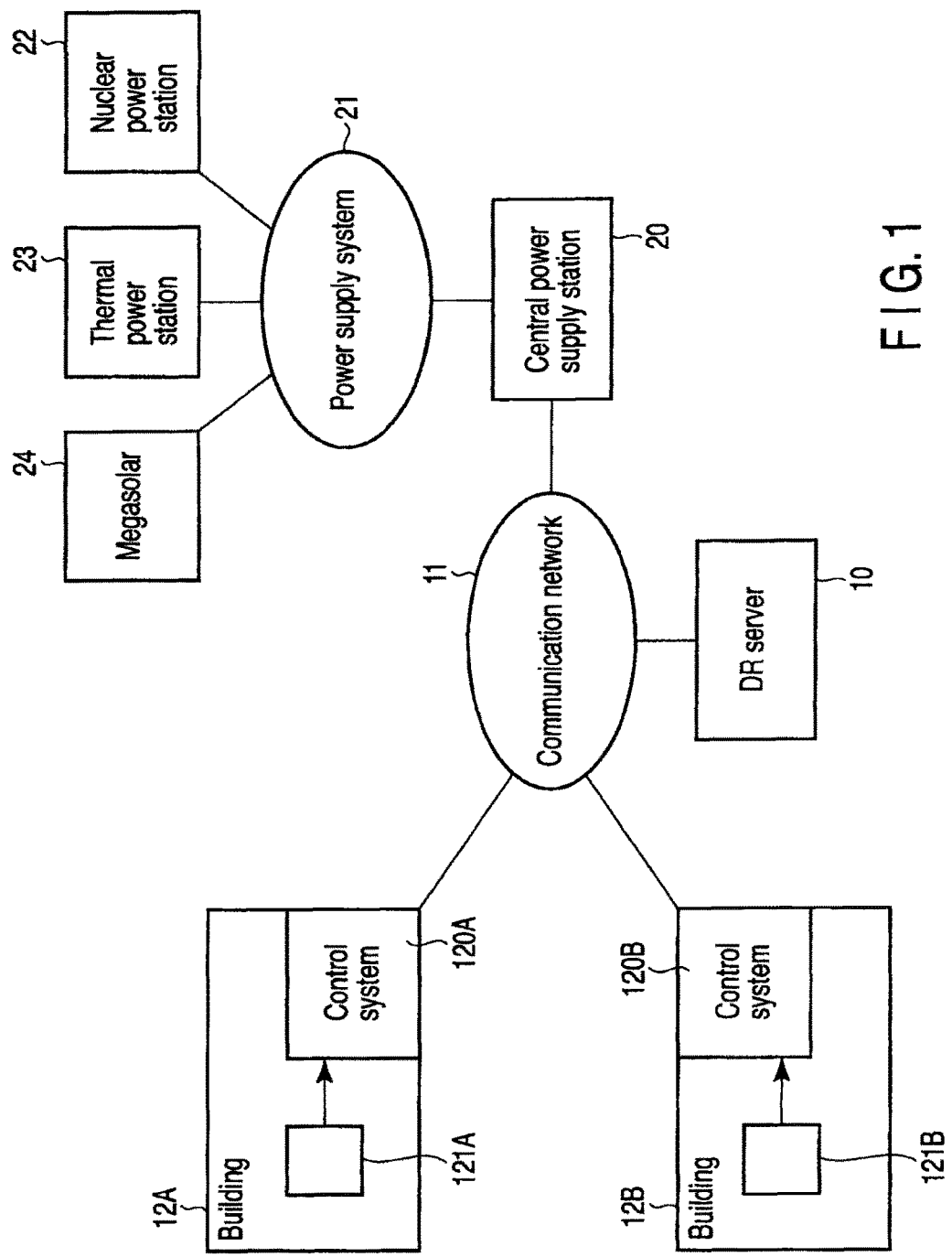
FIG. 1 is a block diagram explaining the configuration of a power control system according to an embodiment.

FIG. 1 is a block diagram explaining the configuration of a power control system according to an embodiment.

The power control system according to the embodiment is designed to accomplish, for example, smart grid. The system has a server (hereinafter called the "DR server") 10 configured to perform a power demand control at the power demanding side. The DR server 10 is a computer that achieves a power control to save the power at the power demanding side, or makes a demand response (DR) to the power-consumption reduction request coming from the power supplying side.

The power supplying side comprises two major components, i.e., a central power supply station 20 and a power supply system 21. The power supply system 21 is composed of power supplying systems connected to a nuclear power station 22 and a thermal power station 23, both functioning as main power sources, and also to a solar power apparatus (megasolar) 24 functioning as a distributed power source. The central power supply station 20 is a power supply system that performs an integrated control on the power supply system 21, thereby supplying power to the power demanding side.

In the embodiment, the power demanding sides are buildings 12A and 12B. The DR server 10 exchanges data with the central power supply station 20 through a communication network (e.g., the Internet) 11. Further, the DR server 10 exchanges data with the control systems 120A and 120B provided in the buildings 12A and 12B, respectively, through the communication network 11.

Each of the control systems 120A and 120B comprises a computer and various peripheral devices. The control system 120A is configured to control the power consumption in the illumination devices, air conditioners, elevators and OA apparatuses (including personal computers and printers), all installed in the building 12A. Similarly, the control system 120B is configured to control the power consumption in the illumination devices, air conditioners, elevators and OA apparatuses (including personal computers and printers), all installed in building 12B. Moreover, the control systems 120B and 120B collect measured data items output from the various sensors 121A and 121B installed in buildings 12A and 12B, respectively.

In response to the demands coming from the DR server 10, the control systems 120B and 120B process the measured data items collected, and generate environmental data that is required to control power demands as will be described later. The control systems 120B and 120B transmits the environmental data to the DR server 10 through the network 11. The sensors 121A and 121B include cameras for photographing the persons in the buildings, sensors for counting the persons in the buildings, illuminometers for measuring the luminance of the illumination devices, thermometers for measuring the temperatures in the rooms, humidity sensors for measuring the humidity in the rooms, anemometers for measuring the air flow in the rooms, and sensors for detecting the on- or off-state of the OA apparatuses.

[Power Demand Control]

The power demand control according to the embodiment will be explained with reference to FIG. 2 to FIG. 5.

FIG. 2 is a block diagram explaining the configuration of the system at a power demanding side. In this embodiment, the power demanding side is divided into a plurality of areas. Four buildings 12A to 12D, for convenience, are assumed to exit in district X. The DR server 10 performs a power demand control (demand response control) with respect to buildings 12A to 12D. The basic operation the DR server 10 performs will be explained with reference to the flowchart of FIG. 3.

The DR server 10 starts the power demand control on receiving a demand instruction issued by the central power supply station 20 and transmitted through the network 11 (Step S1). The demand instruction is a power-consumption reduction request requesting that the power consumption in district X should be reduced by, for example, 1000 kW.

In response to the demand instruction, the DR server 10 performs a power demand control, distributing four target power-reduction values to the four buildings 12A to 12D that exit in district X, respectively, in order to reduce the power consumption by 1000 kW. That is, the DR server 10 first acquires environmental data representing the environmental conditions of buildings 12A to 12D (Step S2). More precisely, the environmental data is composed of four data items generated by the control systems 120 and representing the numbers of persons in buildings 12A to 12D, respectively, and each building. The environmental data items have been generated by the control systems 120A to 120D installed in buildings 12A to 12D, respectively.

The DR server 10 acquires the environmental data items from the control systems 120A to 120D. From the environmental data items thus acquired, the DR server 10 determines four target power-reduction values for buildings 12A to 12D (Step S3). The DR server 10 determines the target power-reduction value for each building from, for example, the number of persons in action in the building. More specifically, the DR server 10 allocates, to the floors and the zones on each floor, the target power-reduction values determined from the number of persons on each floor or zone of the building and with the power consumption characteristics of each floor or zone (Step S4). An example of power consumption characteristic is the power consumed in the computer room, which cannot be estimated from the number of persons working in the room.

That is, on receiving a demand instruction issued from the central power supply station 20 and instructing that the power consumption in district X should be reduced by 1000 kW, the DR server 10 distributes to buildings 12A to 12D the target power-reduction values based on the environmental data items (e.g., numbers of persons) about buildings 12A to 12D. Note that the DR server 10 may be installed in one building, or in one area. In the former case, the DR server 10 manages the power consumption in the building only. In the latter case, it manages the power consumption in many buildings as shown in FIG. 2. Moreover, the DR server 10 may be installed in one power supplying system. In this case, the DR server 10 performs an integrated power-consumption control over many areas, not power consumption controls in the respective areas. Further, the DR server 10 may perform distribute target power-reduction values to the buildings in accordance with the power consumption characteristic of, for example, a computer room.

How the DR server 10 performs the power demand control will be explained with reference to the flowchart of FIG. 4.

As described above, the DR server 10 performs a power demand control in response to a demand instruction, in accordance with environmental data that represents the number of persons in a building. Assume that the DR server 10 performs the power demand control on building 12A. As shown in FIG. 2, building 12A has floors A and B, each consisting of two zones. More precisely, floor A consists of zones A1 and A2, and floor B consist of zones B1 and B2. That is, either floors A and B or zones A1, A2, B1 and B2 are regarded as areas at the power demanding side.

As shown in FIG. 1, the control system 120A provided in building 12A collects measured data generated by the cameras and man-counting sensors used as sensors 121A and representing the numbers of persons on or in the respective floors or zones. The control system 120A transmits the measured data (i.e., number-of-person data) to the DR server 10. The DR server 10 can thus acquire the number-of-person data as environmental data (Step S11).

In order to count the persons in the building, the images photographed by the cameras used as sensors 121A. The control system 120A performs an image recognizing method. In this process, the images photographed by the cameras are processed, counting the persons in action on each floor or in each zone. Further, another method may be used to count persons, in which the man-counting sensors installed at the entrance or gate to the building are used as sensors 121A to count the persons in the building. In this method, the man-counting sensors installed at the elevators, escalators and stairs provide data, from which the number of persons on each floor or in each zone can be inferred. Still another method may be used to count persons at high accuracy, which utilizes the number-of-person data held in the entry-exit management system that manages the entry and exit to and from each floor or each zone of the building.

The DR server 10 thus acquires the number-of-person data about each floor or each zone, as environmental data, from the measured data collected by the control system 120A provided in building 12A through the communication network 11. The DR server 10 acquires the number-of-person data about each floor or each zone, as environmental data, also from the control systems of the other buildings 12B to 12D.

The DR server 10 calculates the power consumption in the building and the power consumption on each floor or in each zone, from the measured data transmitted from the control system 120A (Step S12). On the basis of the power consumption thus calculated, the DR server 10 allocates no target power-reduction values to any floor or zone of a building, which consumes very little power is extremely small or to any building (e.g., vacant building) that consumes very little power. Note that different power-consumption values are set to the floors or zones, respectively, each power-consumption value being the sum of power consumed by the illumination devices, air conditioners and OA apparatuses, all installed on the floor or in the zone.

Next, the DR server 10 calculates the target power-reduction values for the respective floors or zones (Step S13). Assume that a target power-reduction value W (in kW) is allocated to the entire building 12A. The DR server 10 recognizes the number NA of persons excising on floor A of building 12A and the number NB of persons excising on floor B thereof. Further, the DR server 10 recognizes the number Na1 of persons excising in zone A1 of floor A, the number Na2 of persons excising in zone A2 of floor A, the number Nb1 of persons excising in zone B1 of floor B, and the number Nb2 of persons excising in zone B2 of floor B.

The DR server 10 then allocates target power-reduction values to the floors and zones of building 12A, as will be specified below. That is, the target power-reduction value $W_A$ for floor A is calculated by formula of $W_A = W \times NA/$ (NA+NB). Similarly, the target power-reduction value $W_B$ for floor B is calculated by formula of $W_B=W\times NB/(NA+NB)$.

The target power-reduction value $W_{A1}$ allocated to zone A1 is calculated by formula of $W_{A1}=W_A\times Na1/(Na1+Na2)$. The target power-reduction value $W_{A2}$ allocated to zone A2 is calculated by formula of $W_{A2}=W_A\times Na2/(Na1+Na2)$. The target power-reduction value $W_{B1}$ allocated to zone B1 is calculated by formula of $W_{B1}=W_B\times Nb1/(Nb1+Nb2)$. The target power-reduction value $W_B2$ allocated to zone B2 is calculated by formula of $W_{B2}=W_B\times Nb2/(Nb1+Nb2)$. In these formulae, each term may be multiplied by a prescribed weight coefficient, so that the target power-reduction value calculated may be balanced with the actual target power-reduction value.

How to calculate a target power-reduction value by substituting the terms of each formula set forth above will be explained. Assume that the target power-reduction value for building 12A is set to 100 kW, the number NA of persons on floor A to 100, the number NB of persons on floor B to 200. Also assume that the number Na1 of persons in zone A1 of floor A is set to 10, the number Na2 of persons in zone A2 of floor A is set to 90, the number Nb1 of persons in zone B1 of floor B is set to 30, and the number Nb2 of persons in zone B2 of floor B is set to 170. Then, the following target power-reduction values will be allocated to the floors and zones of the building 12.

The target power-reduction value $W_A$ allocated to floor A is 100 kW×(⅓), or about 33 kW. Similarly, the target power-reduction value $W_B$ allocated to floor B is 100 kW×(⅔), or about 66 kW.

Further, the target power-reduction value $W_{A1}$ allocated to zone A1 is 33 kW×(1/10), or about 3.3 kW. The target power-reduction value $W_A2$ allocated to zone A2 is 33 kW×(9/10), or about 29.7 kW. The target power-reduction value $W_{B1}$ allocated to zone B1 is 66 kW×(3/20), or about 9.9 kW. The target power-reduction value $W_B2$ allocated to zone B2 is 66 kW×(17/20), or about 56.1 kW.

The DR server 10 calculates the target power-reduction values for the floors and zones of building 12A in district X, as explained above. For the floors and zones of the other buildings 12B to 12D, the DR server 10 can of course calculate target power-reduction values. Further, the DR server 10 may calculate the target power-reduction values from the electric charges the power demanding side has paid, not from the number-of-person data, i.e., environmental data.

After calculating the target power-reduction values, the DR server 10 generates power control data for controlling the power consumption to reduce the same to these target values (Step S14). The power control data is operating control data for controlling the outputs of, for example, the air conditioners and illumination devices. The control data may instruct that a specific number of 100 W-illumination devices should be turned off or dimmer control should be performed on these illumination devices. Alternatively, the control data may instruct that an air conditioner that consumes 500 W per hour should be turned off or that the cooling temperature should be raised.

In this embodiment, the DR server 10 performs the power demand control, thereby allocating target power-reduction values to the floors and zones, in accordance with the environmental data representing the positional relation of floors and zones and the numbers of persons on the floors or in the zones. The environmental data may represent not only the numbers of persons on the floors or in the zones, but also the motion data or action data about these persons. The motion data or the action data can be extracted from the images photographed by cameras used as image sensors. Moreover, the wireless tags the people hold are be used, extracting position data and, ultimately, acquiring the motion data about the persons on a specific floor or in a specific zone. The acceleration sensors the people hold are used, detecting the motion each person makes or measuring the distance he or she moves. The DR server 10 obtains the motion data and action data in the form of weight coefficients for the formulae specified above, and calculates the target power-reduction values for the respective zones, floors and buildings.

Any building has areas, such as a computer room, in which the air conditioners cannot be turned off. The DR server 10 may therefore perform the power demand control, regarding such an area as non-controlled area. The DR server 10 may determine whether the power consumption in any area having illumination devices should be reduced or not, in accordance with the power being consumed in the area. This is because the illumination devices can be turned on or off in accordance with whether people are in the area where they are installed. Any area where the very important customers are sitting may not be subjected to the power control.

Specific Embodiment

Figure 5:
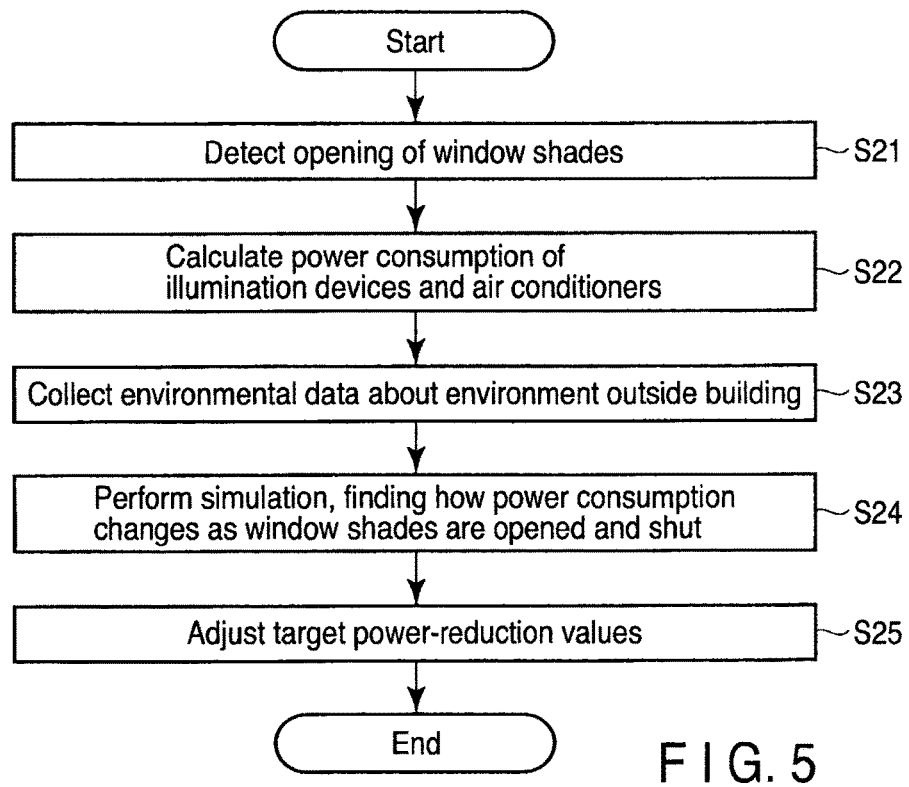
FIG. 5 is a flowchart explaining how a specific embodiment operates.

FIG. 5 is a flowchart explaining how a specific embodiment operates.

This embodiment is a method of performing an effective power demand control in a room, in accordance with the opening of the window shade used in the room and the target power-reduction value allocated to the room.

The DR server 10 acquires the data representing the openings of the window shades in, for example, zone A1 on floor A of building 12A (Step S21). This data is transmitted from the control system 120A. If the window shades are of electrically-driven type, the devices controlling the shades output, to the DR server 10, the detection signals representing the openings of the shades. If the window shades are of the type not electrically driven, the control system 120A performs a recognition process on the images photographed by the cameras installed in the room, thereby inferring the openings of the window shades.

Next, the DR server 10 calculates the power consumption of the illumination devices and air conditioners installed in zone A1, on the basis of the measured data transmitted from the control system 120A (Step S22).

The DR server 10 then collects environmental data about building 12A (Step S23). This environmental data represents, for example, the temperature and wind power measured outside building 12A. Using the environmental data, the DR server 10 performs simulation, determining how the power consumption changes as the window shades are opened and shut (Step S24).

The air conditioners consume much power in summer when the temperature in the rooms is high. If the window shades are shut, the operating efficiency of each air conditioner will increase. On the other hand, however, more illumination devices must be turned on to maintain the illuminance. This is why the DR server 10 performs simulation, calculating well-balanced power consumptions of the air conditioners and illumination devices.

In spring or fall, the outdoor temperature is neither too high nor too low for people. Therefore, if the window shades are opened, airing the building or guiding radiant heat into the building, thereby to reducing the output of the air conditioners. In addition, the rooms are well lighted with the external light, and more illumination devices can be turned off than otherwise. In this case, too, the DR server 10 can calculate, through the simulation, well-balanced power consumptions of the air conditioners and illumination devices.

Then, the DR server 10 adjusts the target power-reduction values for the air conditioners and illumination devices to make them balanced with one another, in accordance with the allocated to the result of the simulation conducted while the window shades remain shut (Step S25). In other words, the DR server 10 renders these target power-reduction values well balanced, in consideration of the opening of the window shades at the windows of the building. An effective power demand control is thereby accomplished in response to the demand instruction.

In the process of adjusting the target power-reduction values allocated to the air conditioners and illumination devices, priority may be assigned to the air conditioners because the target power-reduction value for the air conditioners can be more easily adjusted than the value for the illumination devices in accordance with, for example, the number of persons. If the priority is assigned to the illumination devices, the target power-reduction value for them must be adjusted in accordance with not only the number of persons, but also the locations of persons, in order to achieve an effective power demand control. Alternatively, the allocation of target power-reduction values may be so adjusted to cut the power consumption peaks in, for example, various time brackets.

With respect to the common-use, huge equipment provided in the building, such as elevators and escalators, the DR server 10 may perform a power demand control to stop, for example, one of the elevators in accordance with the number of the persons in the building or the number of the persons actually moving in the building. Alternatively, the DR server 10 may perform a power demand control to stop any elevator that can stop at the floors on which there are few people. In either case, the power consumption of the common-use equipment can be reduced.

To accomplish this power demand control, the DR server 10 needs priority data, too. Priority is assigned to, for example, the air conditioners, because the air conditioners can be more easily controlled than the illumination devices in accordance with, for example, the number of persons. If the priority is assigned to the illumination devices, the devices must be automatically controlled in accordance with not only the number of persons, but also the locations of persons.

A power-consumption reduction request cuts the power consumption peaks in, for example, various time brackets. The power demand may be predicted on the basis of the power consumption trend described in history data.

Modified Embodiment

Figure 6:
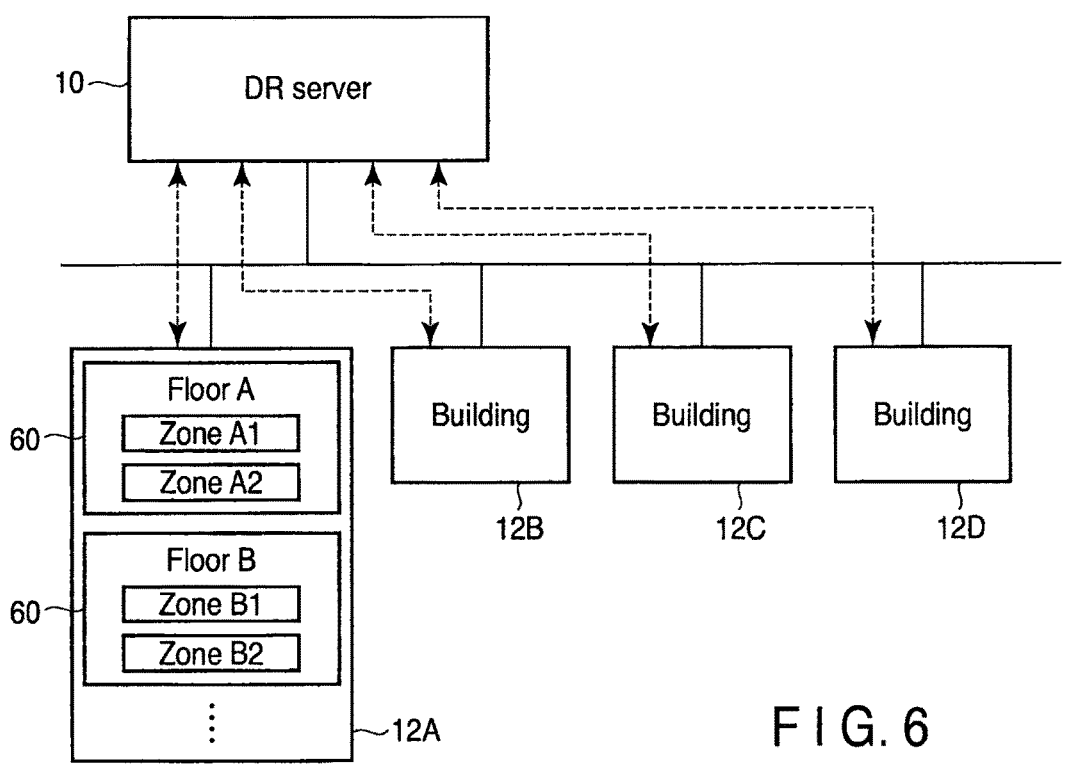
FIG. 6 is a diagram explaining a method of presenting information, according to the embodiment.

FIG. 6 is a diagram explaining a modification of the embodiment, or a method of giving the information indicating the control performed by the DR server 10.

As shown in FIG. 6, the DR server 10 presents the information representing the demand instruction (i.e., power-consumption reduction request) received and the actual state of the power demand control, on displays 60 installed in the floors or zones of a building or on the screen of a terminal common to the floors or zones. To display this information, the DR server 10 may use an image distributing system called "digital signage").

The DR server 10 has a module that gives the information to, for example, the power manager stationed in each building, in the form of a WEB page or an electronic mail. Alternatively, the DR server 10 may be configured to electronic data, as a power demand control report, periodically to the power management terminal installed in each building.

Moreover, the DR server 10 may have a database accumulating the trend data generated in the past, may acquire the trend data from the database by using date-time data and meteorological data as retrieval keys, and may use the trend data as index of the power-consumption reduction request.

In most office buildings, the power consumption per man is much greater on a holiday than on any working day. Hence, it is important to encourage the persons working on a holiday to reduce the power consumption. Therefore, the DR server 10 may calculate the power consumed per man, by dividing the power consumed by the illuminating devices being used, by the number of these persons and then may display the power consumed per man on the displays 60. Alternatively, the DR server 10 may calculate the power consumed per man if all persons working on the holiday are assembled in, for example, a conference room, and if the illumination devices and air conditioners installed in the conference room are used, and may display the power consumption so calculated. Still alternatively, the DR server 10 may perform a power demand control, in which some of the illumination devices are turned off, the cooling temperature is raised, and some of the printers are turned off, and may then display these events on the displays 60.

This method of visually presenting the information, if performed, can effectively encourage the people concerned to reduce the power consumption positively.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power control system comprising:
    a data communication unit configured to perform data communication with the power-supplying side that supplies power to the power-demanding side; and
    a power controller configured to perform a power demand control at the power-demanding side,
    wherein the power controller comprises:
    a receiving unit configured to receive a power-consumption reduction request from the power-supplying side via the data communication unit;
    an environmental data acquiring unit configured to acquire, from the power demanding side, environmental data representing environmental states of respective areas of the power demanding side,
    wherein the environmental data contains number-of-person data representing the number of persons in each area of the power-demanding side; and the environmental data acquiring unit is configured to acquire the number-of-person data, by using sensor units installed in the respective areas of the power-demanding side;
    a calculating unit configured to calculate target power-reduction values to reduce the power consumption in the respective areas of the power-demanding side, based on the environmental data about the respective areas, wherein the target power-reduction values are allocated to the respective areas except for an area regarded as a non-controlled area based on the power-consumption reduction request; and a power consumption controller configured to control the power consumption in the respective areas of the power-demanding side, based on the target power-reduction values calculated by the calculating unit.

2. The power control system of claim 1, wherein each of the sensor units includes an image recognizing unit configured to detect the number of the persons in each area, by processing an image photographed by a camera.

3. The power control system of claim 1, wherein the power controller is configured to generate data for use in performing a power control on objects provided in each area, based on the target power-reduction values allocated to the respective areas of the power-demanding side.

4. The power control system of claim 3, wherein the power controller is configured to perform a power control on illumination devices and air conditioners for the power demand control and to adjust the target power-reduction values for the illumination devices and air conditioners in accordance with the environmental states of the respective areas, including the number of the persons, temperature and in each area and illuminance of each area.

* * * * *